US007674845B2

(12) United States Patent
Van Duijnhoven et al.

(10) Patent No.: US 7,674,845 B2
(45) Date of Patent: Mar. 9, 2010

(54) LASER WRITABLE COMPOSITION

(76) Inventors: Francisccus G. H. Van Duijnhoven, Eechofstraat 17, Helmond (NL) 5704 AT; Franciscus W. M. Gelissen, Hauptstrasse 45 A, Gangelt (Selfkant) (DE) D-52538

( * ) Notice: Subject to any disclaimer, the term of this patent is extended or adjusted under 35 U.S.C. 154(b) by 1113 days.

(21) Appl. No.: 10/536,400

(22) PCT Filed: Dec. 4, 2003

(86) PCT No.: PCT/NL03/00861

§ 371 (c)(1),
(2), (4) Date: Oct. 26, 2005

(87) PCT Pub. No.: WO2004/050767

PCT Pub. Date: Jun. 17, 2004

(65) Prior Publication Data

US 2006/0148968 A1 Jul. 6, 2006

(30) Foreign Application Priority Data

Dec. 4, 2002 (NL) .................................... 1022081
May 12, 2003 (NL) .................................... 1023385

(51) Int. Cl.
*C09D 151/00* (2006.01)

(52) U.S. Cl. ...................................................... 523/201

(58) Field of Classification Search .................. 523/201
See application file for complete search history.

(56) References Cited

FOREIGN PATENT DOCUMENTS

| | | |
|---|---|---|
| EP | 0 429 010 | 5/1991 |
| EP | 0 675 168 | 10/1995 |
| EP | 0 708 147 | 4/1996 |
| EP | 0 841 186 | 5/1998 |
| WO | 97/01446 | 1/1997 |

OTHER PUBLICATIONS

International Search Report.

*Primary Examiner*—Edward J Cain
(74) *Attorney, Agent, or Firm*—Nixon & Vanderhye P.C.

(57) ABSTRACT

Laser writable composition comprising a polymeric laser light absorber dispersed in a matrix polymer, the absorber comprising carbonizing particles that comprise a core and a shell, the core comprising a carbonizing polymer having a first functional group, and the shell, comprising a compatibilizing polymer having a second functional group that can react with the first functional group of the carbonizing polymer, further comprising a reflector.

17 Claims, 2 Drawing Sheets

LASER WRITABLE COMPOSITION

This application is the US national phase of international application PCT/NL2003/000861 filed 4 Dec. 2003 which designated the U.S. and claims benefit of NL 1022081, dated 4 Dec. 2002 and NL 1023385, dated 12 May 2003, the entire content of each of which is hereby incorporated by reference.

FIELD

The invention relates to a laser writable composition comprising a polymeric laser light absorber dispersed in a matrix polymer.

BACKGROUND AND SUMMARY

It is generally known that certain compounds can upon irradiation with laser light absorb energy from the laser light and are able to transfer this energy to e.g. a matrix polymer the compound is mixed in, thus causing local thermal degradation of the polymer. This degradation may even lead to carbonisation. Carbonisation here is the process that a polymer decomposes due to energy absorption with carbon remaining behind. The quantity of carbon that remains behind depends on the polymer. Many polymers appear not to yield an acceptable contrast upon laser irradiation, be it as such or even when mixed with laser absorbing compounds. From WO 01/0719 it is known to apply antimony trioxide with a particle size of at least 0.5 μm is applied as the absorber. The absorber is applied in polymeric compositions in such content that the composition contains at least 0.1 wt. % of the absorber so as to be able to apply a dark marking against a light background in the composition. Preferably a nacreous pigment is further added to obtain a better contrast.

Also the known composition has the disadvantage that in many cases, in particular in compositions with polymers that in themselves are only weakly carbonising, only a poor contrast can be obtained by laser irradiation. Further antimony trioxide is suspected to be poisonous and there is a need for laser writable compositions not necessarily containing this compound.

The aim of the invention is to provide a composition to which dark markings having good contrast can be written with laser light, even when the matrix polymer is only weakly carbonising or for other reasons is not easily laser writable and can be antimony oxide free.

It has been found that this aim can be achieved in that the composition comprises a polymeric absorber comprising carbonising particles that comprise a core and a shell, the core comprising a carbonising polymer having a first functional group, and the shell, comprising a compatibilising polymer having a second functional group that can react with the first functional group of the carbonising polymer and in that the composition further comprises a reflector.

DETAILED DESCRIPTION

Figure 1:
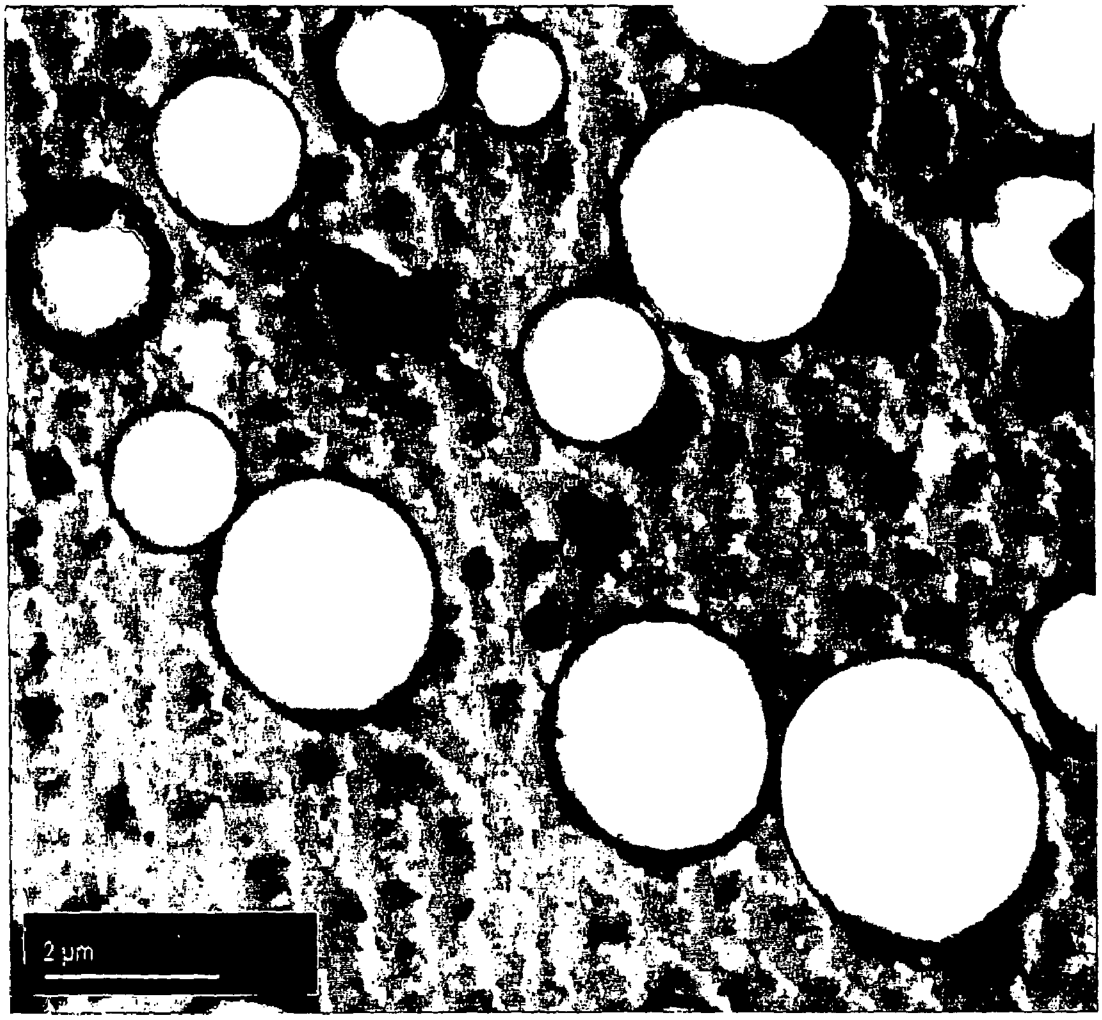
FIGS. 1 and 2 are TEM photographs of Samples MB1 and MB2 of Examples I and II, respectively.
Figure 2:

Surprisingly the presence of the combination of the absorber and the reflector makes the composition laser writable with a good contrast. Upon irradiation with laser light the composition according to the invention are found to produce an unexpectedly high contrast between the irradiated and non-irradiated parts. This contrast is also significantly higher than when a composition is applied that contains the known absorbers, even when the core polymer is a polymer that as such cannot be laser written with an acceptable contrast. This allows writing on objects made from the composition dark patterns by irradiating the object with laser light.

The polymeric laser light absorber comprises carbonising particles, i.e. particles that when being irradiated with laser light give rise to carbonisation in their immediate environment.

To achieve this the carbonising particles comprise a core that comprises a carbonising polymer. Suitable carbonising polymers are semi-crystalline or amorphous polymers. The melting point and the glass transition point, respectively, of the semi-crystalline and the amorphous polymers, respectively, preferably lies above 120 and above 100° C., respectively, and more preferably above 150° C. and above 120° C., respectively.

The carbonising polymer preferably has a degree of carbonisation of at least 5%, defined as the relative quantity of carbon that remains behind after pyrolysis of the polymer in a nitrogen atmosphere. At a lower degree of carbonisation the contrast obtained upon laser irradiation decreases, at a higher degree the contrast increases until saturation occurs. It is surprising that the presence during laser irradiation of a polymer with such a low degree of carbonisation, which in itself produces a scarcely visible contrast, in the core-shell type absorber already makes it possible to obtain a high contrast. Polyamides and polyesters are very suitable due to their availability in a wide range of melting points and have a degree of carbonisation of approximately 6% and 12%, respectively. Polycarbonate is very suitable partly due to its higher degree of carbonisation of 25%.

The carbonising polymer has a first functional group and the compatibilising polymer, which will be discussed later, has a second functional group that can react with the first functional group. As first and second functional groups any two functional groups that can be present in a polymer can be considered that are capable of reacting with each other. Examples of suitable functional groups are carboxylic acid groups and ester groups and the anhydride and salt forms thereof, an epoxy ring, an amine group, an alkoxy silane group or an alcohol group. It is known to the person skilled in the art in which combinations of such functional groups can react with each other. The functional groups may be present in the carbonising and compatibilising polymer intrinsically, such as the terminal carboxylic acid group in a polyamide, but may also have been applied to them by for example grafting, as usually applied to provide for example polyolefins with a functional group, for example leading to well known polyethylene grafted with maleic acid.

In this respect suitable first functional groups are for example hydroxy, phenolic, (carboxylic) acid (anhydride), amine, epoxy and isocyanate groups. Examples of suitable carbonising polymers are polybutylene terephthalate (PBT), polyethylene terephthalate (PET), amine-functionalised polymers including semi-crystalline polyamides, for example polyamide-6, polyamide-66, polyamide-46 and amorphous polyamides, for example polyamide-6I or polyamide-6T, polysulphone, polycarbonate, epoxy-functionalised polymethyl (meth)acrylate, styrene acrylonitrile functionalised with epoxy or other functional groups as mentioned above. Suitable carbonising polymers are those having the usual intrinsic viscosities and molecular weights. For polyesters the intrinsic viscosity lies for example between 1.8 and 2.5 dl/g, measured in m-cresol at 25° C. For polyamides the molecular weight lies for example between 5,000 and 50,000.

The carbonising polymer preferably is capable of absorbing laser light of a certain wavelength. In practice this wavelength lies between 157 nm and 10.6 μm, the customary wavelength range of lasers. If lasers with larger or smaller wavelengths become available, further carbonising polymers may also be considered for application in the composition according to the invention. Examples of such lasers working in the said area are $CO_2$ lasers (10.6 μm), Nd:YAG lasers (1064, 532, 355, 266 nm) and excimer lasers of the following wavelengths: $F_2$ (157 nm), ArF (193 nm), KrCl (222 nm), KrF (248 nm), XeCl (308 nm) and XeF (351 nm). Preferably Nd:YAG lasers and $CO_2$ lasers are used since these types work in a wavelength range which is very suitable for the induction of thermal processes that are applied for marking purposes.

The carbonising particles further comprise a shell, comprising a compatibilising polymer having a second functional group that can react with the first functional group of the carbonising polymer. The shell preferably at least partly surrounds the core.

Suitable as the compatibilising polymer are thermoplastic polymers having a functional group, denoted as second functional group, that can react with the first functional group of the carbonising polymer in the composition applied. Particularly suitable as the compatibilising polymer are polyolefin polymers grafted with an ethylenically unsaturated functionalised compound. The ethylenically unsaturated functionalised compound grafted on the polyolefin polymer can react with the first functional group of the carbonising polymer, for example with a terminal group of polyamide. Polyolefin polymers that may be considered for use in the composition according to the invention are those homo- and copolymers of one or more olefin monomers that can be grafted with an ethylenically unsaturated functionalised compound or in which the functionalised compound can be incorporated into the polymer chain during the polymerisation process. Examples of suitable polyolefin polymers are ethylene polymers, propylene polymers. Examples of suitable ethylene polymers are all thermoplastic homopolymers of ethylene and copolymers of ethylene with as comonomer one or more α-olefins with 3-10 C-atoms, in particular propylene, isobutene, 1-butene, 1-hexene, 4-methyl-1-pentene and 1-octene, that can be prepared using the known catalysts such as for example Ziegler-Natta, Phillips and metallocene catalysts. The quantity of comonomer as a rule lies between 0 and 50 wt. %, and preferably between 5 and 35 wt. %. Such polyethylenes are known amongst other things by the names high-density polyethylene (HDPE), low-density polyethylene (LDPE), linear low-density polyethylene (LLDPE) and linear very low-density polyethylene (VL(L)DPE). Suitable polyethylenes have a density between 860 and 970 $kg/m^3$. Examples of suitable propylene polymers are homopolymers of propylene and copolymers of propylene with ethylene, in which the proportion of ethylene amounts to at most 30 wt. % and preferably at most 25 wt. %. Their Melt Flow Index (230° C., 2.16 kg) lies between 0.5 and 25 g/10 min, more preferably between 1.0 and 10 g/10 min. Suitable ethylenically unsaturated functionalised compounds are those which can be grafted on at least one of the aforesaid suitable polyolefin polymers. These compounds contain a carbon-carbon double bond and can form a side branch on a polyolefin polymer by grafting thereon. These compounds can be provided in the known way with one of the functional groups mentioned as suitable in the above.

Examples of suitable ethylenically unsaturated functionalised compounds are the unsaturated carboxylic acids and esters and anhydrides and metallic or non-metallic salts thereof. Preferably the ethylenic unsaturation in the compound is conjugated with a carbonyl group. Examples are acrylic, methacrylic, maleic, fumaric, itaconic, crotonic, methyl crotonic and cinnamic acid and esters, anhydrides and possible salts thereof. Of the compounds with at least one carbonyl group, maleic anhydride is preferred.

Examples of suitable ethylenically unsaturated functionalised compounds with at least one epoxy ring are, for example, glycidyl esters of unsaturated carboxylic acids, glycidyl ethers of unsaturated alcohols and of alkyl phenols and vinyl and allyl esters of epoxy carboxylic acids. Glycidyl methacrylate is particularly suitable.

Examples of suitable ethylenically unsaturated functionalised compounds with at least one amine functionality are amine compounds with at least one ethylenically unsaturated group, for example allyl amine, propenyl, butenyl, pentenyl and hexenyl amine, amine ethers, for example isopropenylphenyl ethylamine ether. The amine group and the unsaturation should be in such a position relative to each other that they do not influence the grafting reaction to any undesirable degree. The amines may be unsubstituted but may also be substituted with for example alkyl and aryl groups, halogen groups, ether groups and thioether groups.

Examples of suitable ethylenically unsaturated functionalised compounds with at least one alcohol functionality are all compounds with a hydroxyl group that may or may not be etherified or esterified and an ethylenically unsaturated compound, for example allyl and vinyl ethers of alcohols such as ethyl alcohol and higher branched and unbranched alkyl alcohols as well as allyl and vinyl esters of alcohol substituted acids, preferably carboxylic acids and $C_3$-$C_8$ alkenyl alcohols. Further the alcohols may be substituted with for example alkyl and aryl groups, halogen groups, ether groups and thioether groups, which do not influence the grafting reaction to any undesirable degree.

Examples of oxazoline compounds that are suitable as ethylenically unsaturated functionalised compounds in the framework of the invention are for example those with the following general formula

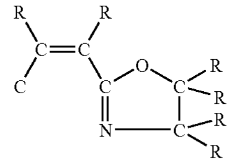

where each R, independently of the other hydrogen, is a halogen, a $C_1$-$C_{10}$ alkyl radical or a $C_6$-$C_{14}$ aryl radical.

The quantity of the ethylenically unsaturated functionalised compound in the polyolefin polymer functionalised by grafting preferably lies between 0.05 and 1 mgeq per gramme of polyolefin polymer.

Both the carbonising and the compatibilising polymer are preferably thermoplastic polymers, as this will facilitate mixing of the compatibilised carbonising particles into the matrix polymer to make it suitable for laser writing. In this respect the presence of a third polymer, further called thinning polymer may further facilitate this mixing and the forming of the polymeric absorber itself by the process described later. As the thinning polymer the same polymers may be considered as those mentioned above for the compatibilising polymer, albeit in their non-functionalised form. As a consequence the composition may also comprise a thinning polymer.

The carbonising polymer contains a first functional group and is preferably bound by means of this group to a second functional group, which is bound to a compatibilising polymer. Thus, around the core of a carbonising particle a layer of a compatibilising polymer, bound to the carbonising polymer by the respective functional groups, is present as a shell, which at least partially screens off the carbonising polymer in the particle from the environment around the compatibilising particle. The thickness of the layer of the compatibilising polymer is not critical and as a rule it is negligible relative to the particle size and amounts to for example between 1 and 10% thereof. For a compatibilising polymer grafted with for example 1 wt. % MA, the quantity of compatibilising polymer relative to the carbonising polymer lies for example between 2 and 50 wt. % and is preferably smaller than 30 wt. %. For other functional groups and/or other percentages of second functional groups, the quantity of the compatibilising polymer should be chosen such that a quantity of second functional groups is present that corresponds to the example given. As the number of second functional groups increases, the size of the compatibilising particles that are formed when the polymers are mixed, preferably melt-mixed, is found to decrease. In the composition, the amount of thinning polymer plus compatibilising polymer should be higher than the amount of carbonising polymer to obtain the desired morphology, so the ratio between these amounts is at least 50:50 and preferably at least 60:40 wt %.

The size of the core of the carbonizing particles in practice lies between 0.2 and 50 μm. For effective absorption of the laser light the size of this core is preferably equal to at least approximately twice the wavelength of the laser light to be applied later for writing a pattern. The size of a core is understood to be the largest dimension in any direction, so for example the diameter for spherical cores and the length of the largest for ellipsoidal particles. A core size of more than twice the wavelength of the laser light admittedly leads to a lower effectiveness in the absorption of the laser light but also to less influence on the decrease of the transparency due to the presence of the absorber particles. For this reason the size of the core preferably lies between 100 nm and 10 μm and more preferably between 500 nm and 2.5 μm.

The absorber is dispersed in the matrix polymer. As the matrix polymer in fact any polymer qualifies that can be processed into an article on which one might wish to apply a dark pattern. Examples of polymers that satisfy this description are polymers chosen from the group consisting of polyethylene, polypropylene, polyamide, polymethyl (meth)acrylate, polyurethane, polyesters thermoplastic vulcanisates, of which SARLINK® is an example, thermoplastic elastomers, of which Arnitel® is an example, and silicone rubbers. The quantity of polymeric absorber in the matrix polymer depends on the desired maximal degree of darkening upon laser irradiation. Usually the quantity of the absorber lies between 0.1 and 10 wt. % of the total of absorber and matrix polymer and any thinning polymer and preferably it lies between 0.4 and 4 wt. % and more preferably between 0.8 and 1.6 wt. %. This gives a contrast that is adequate for most applications without essentially influencing the properties of the matrix polymer.

As a further component a reflector is present in the composition according to the invention. This, preferably particulate, reflector is capable of reflecting laser light of a certain wave length, in particular those specified supra.

Examples of suitable reflectors are oxides, hydroxides, sulphides, sulphates and phosphates of metals such as copper, bismuth, tin, zinc, silver, titanium, manganese, iron, nickel and chromium and laser light absorbing (in)organic dyes. Particularly suitable are tin dioxide, zinc oxide, zinc sulphide, barium titanate and titanium dioxide. A high refractive index for the laser light is an advantage and preferably this refractive index is at least 1.7 and more preferably even more than 1.75.

Although antimony trioxide is a not-preferred reflector, the presence of this material even as particles of a size that is not optimised for laser light absorption brings about the advantageous effect in the composition according to the invention.

The size of the reflector particles was found to be not critical. A number of the compounds exemplified as suitable are not known to have any effect in polymer compositions on irradiation with laser light. Others are known as absorbers for laser light but then only when having a particle size adapted to the wavelength of the irradiating laser light. In the composition of the present invention, however, it is the mere presence of particles of these reflectors that in combination with the polymer absorber particles has appeared to bring about the laser writability of polymer compositions. Thus, even when the particle size of the reflector particles is not adapted to the wavelength of the irradiating laser light a significant synergetic effect with the presence of polymer absorber particles is manifest. Even if any of the materials that can be applied in the composition according to the invention is known for use as a laser absorber it has appeared to be more effective when also the polymeric laser light absorber is present.

The reflector particles preferably can be dispersed in the matrix polymer, in the thinning polymer or in both. It can be present in an amount of 0.5 to 5 wt. % with respect to the total of matrix polymer and polymeric absorber.

The combination of the reflector and the polymeric absorber appears to bring the property of a good laser writability to the matrix polymers, even when one or even both of these alone do not bring this property.

The laser writable composition according to the invention can also contain other additives known for enhancing certain properties of the matrix polymer or adding properties to it.

Examples of suitable additives for this purpose are reinforcing materials, e.g. glass fibers and carbon fibers, nanofillers like clays, including wollastonite, and micas, pigments, dyes and colorants, fillers, e.g. calcium carbonate and talcum, processing aids, stabilizers, antioxidants, plasticizers, impact modifiers, flame retardants, mould release agents, foaming agents.

The amount of these other additives can vary from very small amounts such as 1 or 2 volume % up to 70 or 80 volume % or more, relative to the volume of the compound formed. Additives will normally be applied in such amounts that any negative influence on the contrast of the laser marking obtainable by irradiating the composition will be limited to an acceptable extent. A filled composition that shows a remarkable good laser writability is a composition comprising a polyamide, in particular polyamide-6, polyamide 46 or polyamide 66, and talcum as a filler additive.

If any of these additives has a refractive index above 1.7 the amount of it present is to be included in the total amount of reflector present in the composition.

In another aspect the invention relates to objects, at least partially consisting of the composition of the invention. The parts of these objects that consist of the composition are laser writable with a good contrast. To provide an object with a laser writable surface a layer at least containing the composition according to the invention can be applied to a part or the whole of that surface. As an example, when the surface consists substantially of paper, laser writable paper can be obtained.

Since the polymeric laser absorber and the reflector have to be present in the composition in such low amounts that the properties of the matrix polymer are hardly or not negatively influenced in practice the whole object may consist of the composition according to the invention.

The polymeric laser light absorber according to the invention can be prepared as follows.

As a first step the carbonising polymer having a first functional group is mixed with the compatibilising polymer having a second functional group that is reactive with the first functional group.

It has been found that in this way the particles are formed, consisting of a core of the carbonising polymer, which at at least a part of its surface is provided with a layer of the compatibilising polymer, so that after mixing of these particles into a matrix polymer an optimal contrast is obtained therein when it is laser irradiated.

The mixing takes place above the melting point of both the carbonising polymer and the compatibilising polymer and preferably in the presence of a quantity of a non-functionalized thinning polymer. Thinning polymers that may be considered are in particular those that have been mentioned above as the compatibilising polymer, but now in their non-functionalized form. This thinning polymer does not need to be the same as the functionalized compatibilising polymer but must at least be compatible, in particular miscible, with that polymer. It may be the same as the matrix polymer. The presence of the non-functionalized thinning polymer ensures adequate melt processability of the total mixture so that the desired homogeneous distribution of carbonising particles in the resulting masterbatch, comprising the carbonising particles in the thinning polymer, is obtained. In such a masterbatch the proportion of the functionalized compatibilising plus the non-functionalized thinning polymer preferably lies between 20 and 60 wt. % of the total of the three polymers other than the matrix polymer. More preferably this proportion lies between 25 and 50 wt. %. Within said limits a masterbatch is obtained that can suitably be mixed in through melt processing. A higher proportion than the said 60% is allowable but in that case the quantity of the carbonising polymer proper in the masterbatch is relatively small.

In the melt the functional groups will react with each other and a compatibilising and screening layer of the compatibilising polymer is formed on at least a part of the surface of the core. At some point the screening effect of the compatibilising polymer will become predominant and any unreacted carbonising polymer present in the absorber particles will no longer be able to pass to the surrounding melt. The compatibilising effect is more effective as the difference in polarity between the carbonising and the compatibilising polymer is larger. In the above it was already indicated that the carbonising polymer preferably has a polar character. It is also preferred for the compatibilising and thinning polymer to have a less polar character than the carbonising one and more preferably the compatibilising and the thinning polymer are completely or almost completely apolar.

The size of the carbonising particles in the masterbatch obtained has been found to depend on the quantity of second functional groups. The lower and upper limits within which carbonising particles of a suitable size are obtained have been found to be dependent on the carbonising polymer. The particle size decreases as the quantity of second functional groups increases and vice versa. If the quantity of second functional groups is too large, this results in particles that are too small. This leads to a reduction of the contrast upon radiation of an object into which the composition has been mixed in masterbatch form. If the quantity of second functional groups is too small, this results in such large carbonising particles that an inhomogeneous pattern with undesirable coarse speckles is formed upon irradiation of an object into which the carbonising particles have been mixed in masterbatch form. Furthermore the melt viscosity of any thinning polymer influences the size of the carbonising particles in the formed masterbatch. A higher melt viscosity leads to a lower particle size. With the above insights the person skilled in the art will be able, through simple experimentation, to determine the suitable quantity of second functional groups within the limits already indicated therefor in the above.

To obtain a laser writable polymer composition the polymer absorber particles according to the invention, if desired in the form of a masterbatch optionally also comprising a thinning polymer, are mixed into a matrix polymer. It has been found that a composition of a matrix polymer and the polymer absorber particles according to the invention can be written with better contrast with laser light than the known compositions, in particular when the matrix polymer in itself is poorly laser writable.

To facilitate this mixing, the non-functionalized thinning polymer, if present, which serves as the support in the masterbatch, preferably has a melting point that is lower than or equal to that of the matrix polymer. Preferably the carbonising polymer has a melting point that is at least equal to or higher than that of the matrix polymer. The non-functionalized polymer may be the same as the matrix polymer or differ from it. The latter also applies to the carbonising polymer. Thus, it has been found that an polyamide core particles provided with a layer of a maleic anhydride grafted polyethylene as the compatibilising polymer produces a composition that is laser writable with high contrast both when mixed into a polyamide matrix and when mixed into a polyethylene matrix. This favourable effect is achieved both in polyamide and in polyethylene also if the carbonising polymer is, for example, polycarbonate.

The reflector particles as defined above are also mixed in into the composition. The reflector particles may be mixed in into the matrix polymer already before this is mixed with the polymer absorber. The reflector particles may also be mixed with the matrix polymer together with the absorber or separately afterwards. If the polymeric absorber is applied in the form of a masterbatch comprising a thinning polymer this masterbatch may already contain the reflector particles.

When the polymer absorber is being mixed into the matrix polymer the shape of the carbonising particles may change due to the shear forces that occur, in particular they can become more elongated in shape, so that the size increases. This increase will generally be not larger than a factor 2 and if necessary this can be taken into account when choosing the particle size for the mixing into the matrix polymer.

The polymeric absorber containing matrix polymer can be processed and shaped using the techniques known for thermoplastics processing, including foaming. The presence of the laser writable polymer absorber usually will not noticeably influence the processing properties of the matrix polymer. In this way almost any object that can be manufactured from such a plastic can be obtained in a laser writable form. Such objects can for example be provided with functional data, barcodes, logos and identification codes and they can find application in the medical world (syringes, pots, covers), in the automotive business (cabling, components), in the telecom and E&E fields (GSM fronts, keyboards), in security and identification applications (credit cards, identification plates, labels), in advertising applications (logos, decorations on corks, golf balls, promotional articles) and in fact any other application where it is useful or otherwise desirable or effective to apply a pattern of some kind to an object substantially consisting of a matrix polymer.

In another aspect the invention relates to a latex comprising the composition according to the invention. Such latex can be produced by melting the polymeric laser absorber as defined herein, preferably containing at least 30 wt % of a thinning polymer, in an extruder, adding a surfactant and water to the melt in the extruder, kneading these components in the extruder to obtain a dispersion and adding to this dispersion a dispersion of a binder, e.g. styrene butadiene rubber or other polymer known per se as binder in latexes. The dispersion of the binder may also contain the reflector in the desired amount but the reflector may also be added separately. The resulting latex contains all the components of the laser writable composition according to the invention, including a binder as the matrix material. The latex can be used to coat objects, e.g. paper. After removal of the dispersing medium, preferably water, a laser writable layer remains on the surface of the object. Amounts of the matrix polymer, reflector and polymeric laser absorber are as defined here before. The binder advantageously is chosen to promote the adhesion to the material of the object the latex is applied upon.

A further suitable form in which the polymer absorber according to the invention can be applied is obtained by grinding a masterbatch of the absorber according to the invention in the thinning polymer, for example cryogenically, to particles with a size between 100 μm and 1 mm, preferably to a size between 150 and 500 μm. In this form the polymer absorber according to the invention can be mixed into non-melt-processable polymers, such as crosslinked polymers or matrix polymers which degrade around their melting point or which have a very highly crystallinity. Examples of such matrix polymers are ultrahigh-molecular polyethylene (UHMWPE), polypropylene oxide (PPO), fluoropolymers, for example polytetrafluorethylene (Teflon) and thermosetting plastics.

The invention will be elucidated by the following examples without being restricted thereto.

In the Examples and Comparative Experiments the following materials are used:

As carbonising polymer:
P1-1. Polycarbonate Xantar® R19 (DSM)

As compatibilising polymer:
P2-1. Fusabond® MO525D polyethylene (Dupont) grafted with 0.9 wt. % MA
P2-2. Excolor PO1020 polypropylene (Exxon) grafted with 1 wt % MA As the thinning polymer:
P3-1. Exact 0230® polyethylene (DEX Plastomers)
P3-2. Stamylan 112MN40 propylene (DSM)

As the matrix polymer+ reflector:
M-1. Polybutylene terephtphalate T06 200 (DSM)+2 wt % $TiO_2$
M-2. Polybutylene terephtphalate TV4 240 (DSM), 20% glass+0.5 wt % ZnS

EXAMPLES I-II

Using a twin-screw extruder (ZSK 30 of Werner & Pfleiderer) two masterbatches, MB1 and MB2, of a carbonising polymer, a compatibilising polymer and a thinning polymer were made. The polymers used and the respective proportions thereof in wt. % are shown in Table 1, as is the size of the formed polymeric laser light absorbing particles in the masterbatch.

The master batches were made with a throughput of 35 kg/h at an extruder speed of 350-400 rpm. The feed zone, barrel and die temperature of the extruder and the outlet temperature of the material are 180, 240, 260 and 260° C., respectively, if polycarbonate is used as the carbonising polymer.

TABLE 1

| | Carbonising Polymer | Compatibilising polymer | | Thinning polymer | | Particle size |
|---|---|---|---|---|---|---|
| | P1-1 | P2-1 | P2-2 | P3-1 | P3-2 | [μm] |
| MB1 | 40 | 10 | | 50 | | 1-3 |
| MB2 | 40 | | 10 | | 50 | 0.5-2.5 |

EXAMPLE III-VIII AND COMPARATIVE EXPERIMENT A+B

Using the master batches from the previous Example a number of laser writable compositions, LP1-LP6, were prepared by mixing different quantities of masterbatch with different matrix polymers as dry-blend. The mixed material was injection moulded to form plates with a thickness of 2 mm. FIGS. I and II show a TEM picture of MB1 and MB2 respectively. The length of the bar in the pictures is 2 μm.

Table 2 gives the proportions of the different components in wt. %.

On the plates a pattern was written using a diode pumped Nd:YAG UV laser of Lasertec, wavelength 355 nm, and a diode pumped Nd:YAG IR laser of Trumpf, type Vectormark compact, wavelength 1064 nm.

For comparison purposes similar plates were made and written that had been manufactured from compositions of M-1 and M-2 only (Compositions A and B).

The degree to which the different materials are laser writable, expressed in qualitative contrast values, is shown in Table 2. The contrast measurements were carried out with a Minolta 3700D Spectrophotometer with the following settings: CIELAB, light source 6500 Kelvin (D65), spec colour included (SCI) and angle of measurement 10°. The laser settings were continually optimised to the maximum feasible contrast at the used wavelengths of 355 and 1064 nm.

| Composition | MB1 | MB1 | M-1 T06 200 | M-2 TV4 240 | Contrast 355 nm | Contrast 1064 nm |
|---|---|---|---|---|---|---|
| A | 0 | | 100 | | ••• | ••• |
| LP1 | 2 | | 98 | | ••••• | ••••• |
| LP2 | 4 | | 96 | | ••••• | ••••• |
| LP3 | | 2 | 98 | | ••••• | ••••• |
| B | 0 | | | 100 | • | ••• |
| LP4 | 2 | | | 98 | ••• | ••••• |
| LP5 | 4 | | | 96 | ••••• | ••••• |
| LP6 | | 2 | | 98 | ••• | ••••• |

From the results it is clear that the plates made from compositions according to the invention can be written with a laser obtaining a good to excellent contrast, even without antimony trioxide being present in the composition.

| Qualification of contrast: | |
|---|---|
| Very poor contrast and granular | — |
| Poor contrast | • |
| Moderate contrast | •• |
| Good contrast | ••• |
| Very good contrast | •••• |
| Excellent contrast | ••••• |

The invention claimed is:

1. Laser writable composition comprising a polymeric laser light absorber dispersed in a matrix polymer, the absorber comprising carbonising particles that comprise a core and a shell, the core comprising a carbonising polymer having a first functional group, and the shell, comprising a compatibilising polymer having a second functional group that can react with the first functional group of the carbonising polymer, further comprising a reflector.

2. Laser writable composition according to claim 1, further comprising a thinning polymer.

3. Laser writable composition according to claim 1, in which the reflector is present in the matrix polymer.

4. Laser writable composition according to claim 1, in which the reflector is present in the thinning polymer.

5. Laser writable composition according to claim 1, in which the size of the core ranges from 100 nm to 10 μm.

6. Laser writable composition according to claim 5, in which the size of the core ranges from 500 nm to 2 μm.

7. Laser writable composition according to any of claim 1, in which the carbonising polymer is chosen from the group consisting of polyamides, polyesters and polycarbonate.

8. Laser writable composition according to claim 1, wherein the compatibilising polymer is chosen from the group consisting of maleic anhydride modified polyethylene and polypropylene.

9. Laser writable composition according to claim 1 in which 0.1 to 10 wt. % of the polymeric absorber is present.

10. Laser writable composition according to claim 9, in which 0.5 to 5 wt. % of the polymeric absorber is present.

11. Laser writable composition according to claim 10, in which 1 to 3 wt. % of the polymeric absorber is present.

12. Object, at least partially consisting of the composition according to claim 1.

13. Object, the surface of which is provided with a laser writable layer that at least contains the composition according to claim 1.

14. Object according to claim 13, with at least 80% of the surface of the object consisting of a polymer.

15. Object according to claim 13, the surface of which consists substantially of paper.

16. Latex containing the composition according to claim 1 in a dispersing medium.

17. Latex according to claim 16, in which the dispersing medium is water.

* * * * *